United States Patent [19]

Hirota

[11] Patent Number: 5,130,820
[45] Date of Patent: Jul. 14, 1992

[54] IMAGE PROCESSING DEVICE
[75] Inventor: Yoshihiko Hirota, Osaka, Japan
[73] Assignee: Minolta Camera Kabushiki Kaisha, Osaka, Japan
[21] Appl. No.: 483,811
[22] Filed: Feb. 23, 1990
[30] Foreign Application Priority Data Feb. 25, 1989 [JP] Japan .................. 1-44059
Feb. 25, 1989 [JP] Japan .................. 1-44060
Feb. 25, 1989 [JP] Japan .................. 1-44061

[51] Int. Cl.$^5$ .............................. H04M 1/00
[52] U.S. Cl. ...................... 358/447; 358/448; 358/463
[58] Field of Search ............... 358/447, 445, 463, 448

[56] References Cited
U.S. PATENT DOCUMENTS 4,328,425  5/1982  Stoffel ........................ 358/80
4,328,426  5/1982  D'Ortenzio ................. 250/578
4,661,843  4/1987  Sekizawa et al. ........... 250/578
4,860,118  8/1989  Arimoto ....................... 358/447

Primary Examiner—Edward L. Coles, Sr.
Attorney, Agent, or Firm—Burns, Doane, Swecker & Mathis

[57] ABSTRACT

An image processing device for reading an original image by shifting in a sub-scanning direction image sensors provided in a main scanning direction to serially output image signals read, includes line memories for storing image signals by a plurality of lines in the sub-scanning direction, read for every line by the image sensors, an output device for outputting in parallel the image signals from the line memories, and an edge emphasizing device for carrying out edge emphasis in accordance with the image signals outputted by the output device in response to signals externally applied.

11 Claims, 12 Drawing Sheets

FIG.6A

|   |   |   |   |   |
|---|---|---|---|---|
| 0 | 0 | $-\frac{1}{4}$ | 0 | 0 |
| 0 | 0 | 0 | 0 | 0 |
| $-\frac{1}{4}$ | 0 | 1 | 0 | $-\frac{1}{4}$ |
| 0 | 0 | 0 | 0 | 0 |
| 0 | 0 | $-\frac{1}{4}$ | 0 | 0 |

M1

SUB-SCANNING ↓
MAIN SCANNING →

FIG.6B

|   |   |   |   |   |
|---|---|---|---|---|
| $-\frac{1}{4}$ | 0 | 0 | 0 | $-\frac{1}{4}$ |
| 0 | 0 | 0 | 0 | 0 |
| 0 | 0 | 1 | 0 | 0 |
| 0 | 0 | 0 | 0 | 0 |
| $-\frac{1}{4}$ | 0 | 0 | 0 | $-\frac{1}{4}$ |

M2

SUB-SCANNING ↓
MAIN SCANNING →

| SHARPNESS | SMALL ← | | | STANDARD | | | → LARGE |
|---|---|---|---|---|---|---|---|
| SHARP·DATA | 0 | 1 | 2 | 3 | 4 | 5 | 6 |
| EMPHASIZING COEFFICIENT $\tan \theta$ | 0.25 | 0.5 | 0.75 | 1 | 1.25 | 1.5 | 1.75 |
| SIZE OF SMOOTHING MATRIX | 5 × 5 | | | 3 × 3 | | 1 × 1 | |

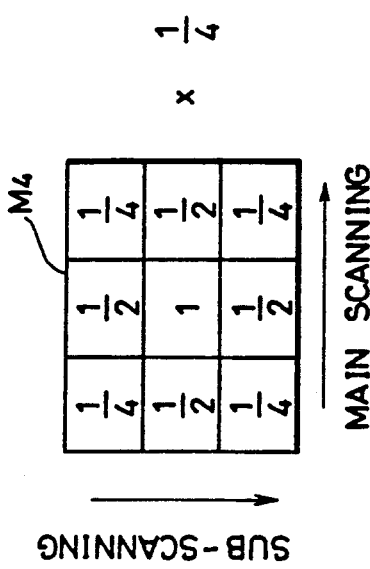
FIG.9B
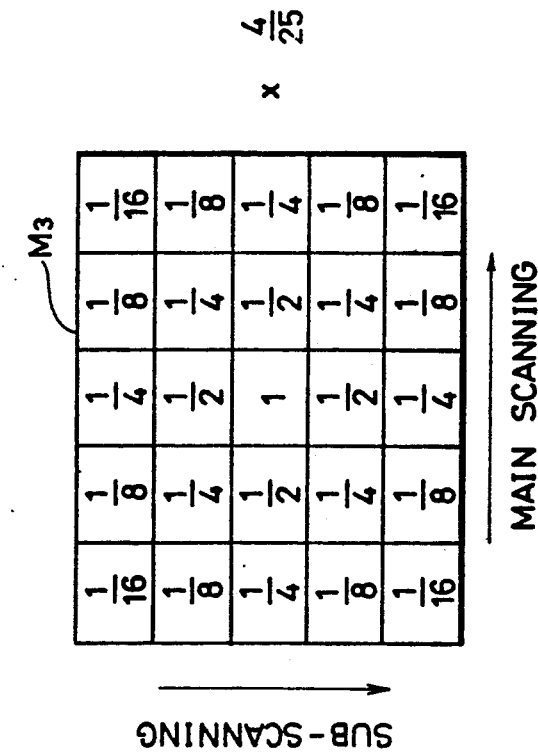
FIG.9A
| MIXING CONTROL MIX7~5 | 0 (000B) | 1 (001B) | 2 (010B) | 3 (011B) | 4 (100B) | 5 (101B) | 6 (110B) | 7 (111B) |
|---|---|---|---|---|---|---|---|---|
| EGD37~30 (EDGE EMPHASIZING) × | 0 | 1/7 | 2/7 | 3/7 | 4/7 | 5/7 | 6/7 | 1 |
| SMD27~20 (SMOOTHING) × | 1 | 6/7 | 5/7 | 4/7 | 3/7 | 2/7 | 1/7 | 0 |
FIG.10

FIG.13

| SMOOTH LVL2 | SMOOTH ON2 | SMOOTH LVL1 | SMOOTH ON1 | SIZE OF MATRIX MAIN SCANNING D. x SUB-SCANNING D. |
|---|---|---|---|---|
| 0 | 0 | 0 | 0 | 5 x 5 |
| 0 | 0 | 0 | 1 | 3 x 5 |
| 0 | 0 | 1 | - | 1 x 5 |
| 0 | 1 | 0 | 0 | 5 x 3 |
| 0 | 1 | 0 | 1 | 3 x 3 |
| 0 | 1 | 1 | - | 1 x 3 |
| 1 | - | 0 | 0 | 5 x 1 |
| 1 | - | 0 | 1 | 3 x 1 |
| 1 | - | 1 | - | 1 x 1 |

IMAGE PROCESSING DEVICE

BACKGROUND OF THE INVENTION

1. Field of the Invention

The present invention relates generally to image processing devices for transmitting image signals for forming hard copy images, and more particularly to an image processing device capable of preventing degradations in the quality of an image resulting from tone reproduction.

2. Description of the Related Art

In an image forming apparatus of a digital processing system such as a digital copier, a facsimile device, or a hard copy system apparatus such as the combination of a computer or a word processor with various types of printers, image information for each pixel of subdivided original images are quantized and handled as digital image data. In these image forming apparatuses, a formation of a binary image is carried out, which is the reproduction of an original image by an arrangement of dots formed of display dots and non-display dots.

When half tone is reproduced in such a binary image, in an image processing device incorporated in the image forming apparatus, image data is binarized compared with threshold data in accordance with an area gradation method represented by a density pattern method or a dither method, and tone reproduction is carried out determining the number of display dots per unit area, depending on the density of the original image.

When the tone reproduction is performed, however, in a dot image portion of the original image such as a printed image of photography, periodical stripe patterns called moire fringe emerge due to a beat phenomenon relating to a repeating period and a dot period of a threshold matrix employed for binarization. Meanwhile, in edge portion of a character image and a line image, display dots become sparse to cause edge loss, i.e., the state that the image is fractionized. Thus, there occurs a degradation in the quality of the images to be formed in both cases.

Therefore, it is necessary for image data to be corrected in advance at the preceding stage of tone reproduction in order to prevent such a degradation in the quality of images.

For preventing the occurrence of moire fringe, smoothing processing known as anti-noise processing is effective, that is, the processing of averaging in weight image data of plural pixels in local areas. For edge loss, the edge emphasizing processing is effective employing a quadratic differential filter (Laplacian filter), which processing is called non-sharp masking for achieving sharpness of an image.

Therefore, as disclosed in Japanese Patent Laying-Open No. 61-157165, for example, the image processing device has conventionally included edge detecting means for controlling the mixing ratio of an output of edge emphasizing means to that of smoothing means as well as the edge emphasizing means and smoothing means, thereby removing the edge loss or moire fringe and also smoothly connecting the character image portion and the dot image portion.

In the binary image formed of definite-size dots, tone and resolution of the image are counter-related to each other. That is, as the number of tones becomes increased, the size of a threshold matrix (unit area for tone reproduction) becomes increased and hence the number of corresponding pixels becomes increased, resulting in a degradation in resolution.

Therefore, the threshold matrix is normally changed depending on the original image for carrying out the tone reproduction. That is, when the original image is mainly a half tone-rich image such as a photograph, the size of the threshold matrix is increased so that the number of tones has priority over resolution. On the other hand, when the original image is a line image such as characters, the size of the threshold matrix is reduced so that resolution has priority over the number of tones.

Further, when a color image is formed by superposition of color toning materials with plural colors, a separate threshold matrix is sometimes provided for each color so that a screen angle (the angle between segments of line passing through the center of each of the threshold matrixes and the direction of main scanning) is different for each color in order to prevent the moire fringe due to a deviation in superposition of the colors.

In the case of tone reproduction by appropriately selecting the threshold matrix as described above, a threshold arrangement is optimized for each matrix, so that the state of the occurrence of edge loss varies for each threshold matrix to be used.

In the conventional image processing device, however, directional property of the quadratic differential filter for edge emphasis is fixed, i.e., the direction of arrangement of a subject pixel and its peripheral pixels affecting the subject pixel. Thus, there has been a problem that changing the threshold matrixes to make them adaptable to the original image causes unrequired emphasizing of edges as well as increased edge loss in a particular threshold matrix, thereby deteriorating reproducibility of an image.

There also has been another problem that eliminating edge loss despite the alteration of the threshold matrixes limits arrangement of the threshold matrix, thereby carrying out no optimal tone reproduction.

SUMMARY OF THE INVENTION

Therefore, an object of the present invention is to prevent edge loss in an image processing device.

Another object of the present invention is to prevent occurrence of moire fringe in an image processing device.

A further object of the present invention is to prevent the occurrence of edge loss or moire fringe in an image processing device by a simple configuration.

A still further object of the present invention is to prevent edge loss in a method of image processing.

Still another object of the present invention is to prevent occurrence of moire fringe in a method of image processing.

The above objects of the present invention can be attained by an image processing device for reading an original image by relatively shifting in a sub-scanning direction a plurality of image sensors arranged linearly in a main scanning direction to serially output image signals each corresponding to pixels read, which device includes a plurality of line memories each capable of storing image signals of at least one line in the main scanning direction, a storage device for sequentially storing in the plurality of line memories, the image signals serially transmitted from the image sensors, an output device for outputting in parallel the image signals from the line memories, and an edge emphasizing device for carrying out edge emphasis of images formed by the image signals in response to signals externally applied.

Since the image processing device includes the elements described above, the edge emphasis is carried out for and in accordance with the image signals outputted by the output device. Consequently, edge loss can be prevented in the image processing device.

According to another aspect of the present invention, an image processing method of reading an original image by relatively shifting in a sub-scanning direction a plurality of image sensors arranged in a main scanning direction to serially output image signals each corresponding to pixels read, including the steps of: sequentially delaying the image signals serially transmitted, outputting in parallel the image signals by a predetermined number of lines, selecting one filter out of a plurality of filters having different directional properties, and emphasizing edges of images formed by the image signals outputted in parallel by the selected filter.

Since the image processing method in accordance with the present invention includes the elements described above, the edge emphasis is carried out, by the selected filter, for and in accordance with the image signals outputted. Consequently, edge loss is prevented by the image processing method.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are diagrams showing a directional property of quadratic differential special filtering;

FIGS. 9A and 9B are diagrams of smoothing matrixes;

FIG. 10 is a table showing the relationship between mixing control data and the amount of image data to be mixed;

FIG. 13 showing the relationship between the combination of selecting signals to be applied to an output selector and the size of matrix;

DESCRIPTION OF THE PREFERRED EMBODIMENTS

An image processing device incorporated in a digital copier will be described as an embodiment of the present invention with reference to the figures.

The digital copier comprises an image reader as an image reading device, and a laser printer for forming a color image by an electrophotographic system in response to an image signal transmitted from the image reader. The image processing device B is incorporated in the image reader to provide various signal processings for a pixel signal which has read an image of the original and output the processed pixel signal as an image signal.

Figure 1:
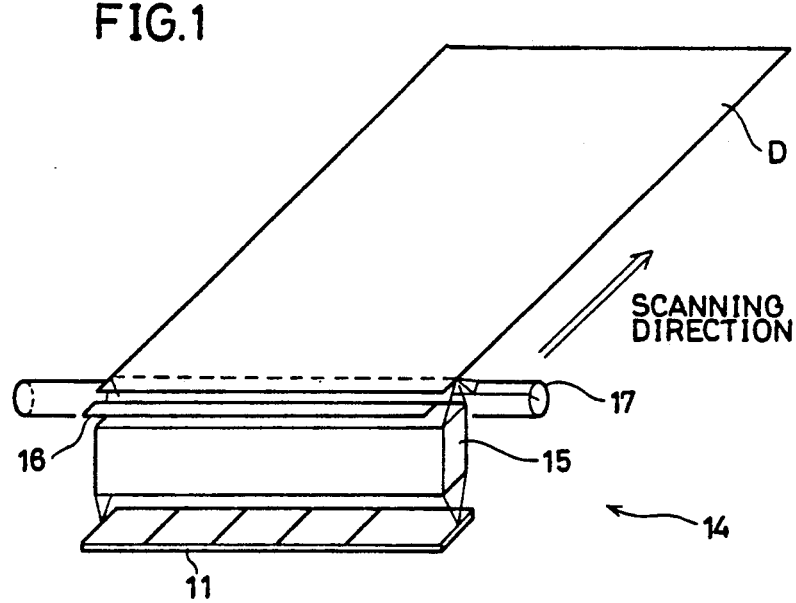
FIG. 1 is a perspective view showing an optical system of an image reader portion.

The image reader will now be described with reference to FIG. 1. Original D set on a platen glass (not shown) is line-scanned longitudinally (in the direction of sub-scanning) by a slider 14 including an image sensor 11 and is then read divided into additive primary colors of R (Red), G (Green) and B (Blue) by an equal-scale magnification type optical system including an exposure lamp 17, a rod lens array 15 and the image sensor 11.

Figure 2:
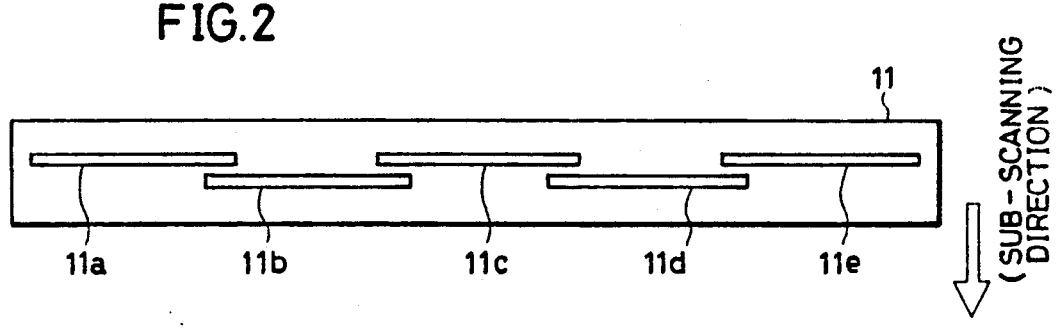
FIG. 2 is a plan view of an image sensor.

As shown in FIG. 2, the image sensor 11 comprises five adhesion type CCD sensor chips 11a–11e arranged in a zigzag manner successively transversely (in the direction of main scanning) and arranged alternately a definite spacing apart from each other in the sub-scanning direction. Due to the definite spacing in the sub-scanning direction, output signals of the rear CCD sensor chips 11a, 11c and 11e in the direction of sub-scanning are delayed compared to those of the front CCD sensor chips 11b and 11d. This delay is corrected by setting timing of a pulse signal to be applied to a line shift gate of each of the CCD sensor chips 11a–11e and delaying the output signals of the front CCD sensor chips 11b and 11d.

Figure 3:
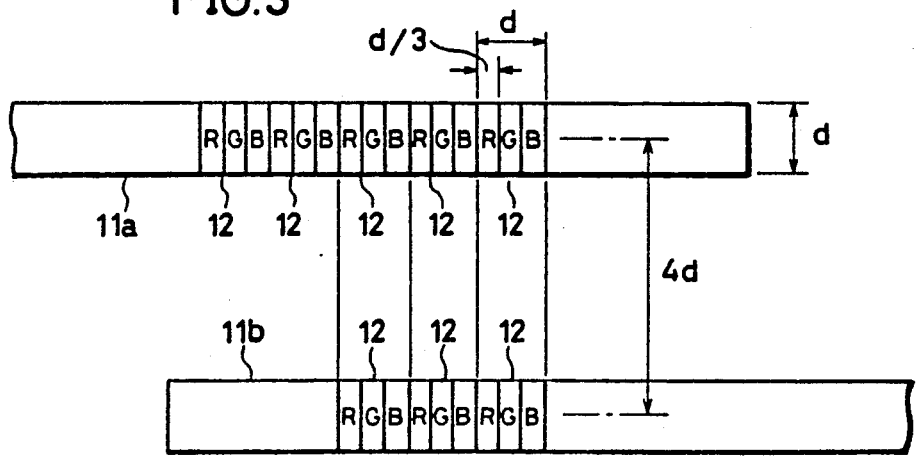
FIG. 3 is an enlarged view schematically showing light receiving portion of CCD sensor chips of FIG. 2.

Each of the CCD sensor chips 11a–11e, end portions of which are shown enlarged in FIG. 3, comprises a large number of elements 12, 12 . . . one in the size of 62.5 μm (d=1/16 mm) square.

Each of the elements 12 is divided into three, and a spectral filter is provided so that one of the divided regions receives light of one color out of three primary colors RGB.

One of the elements 12 corresponds to one of pixels into which an original image is subdivided, and a photoelectric conversion output of one element 12 represents the intensity of reflected light of one color of one pixel.

Figure 4:
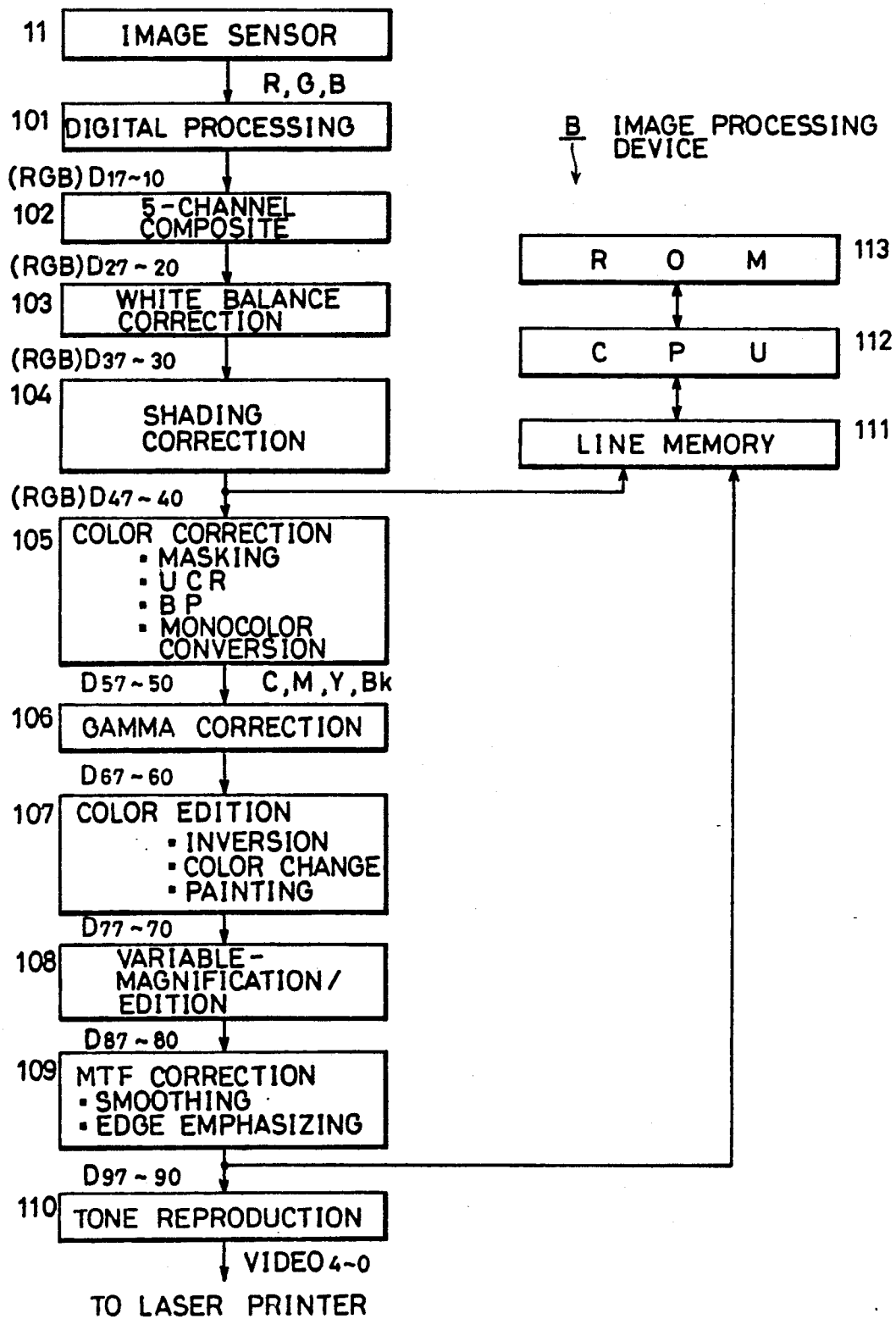
FIG. 4 block diagram of an image processing device.

The image processing device B will now be described with reference to FIG. 4.

In the image sensor 11, all five CCD sensor chips 11a–11e are simultaneously driven in order to increase reading speed in the direction of main scanning. Each of the sensor chips serially outputs valid reading pixel signals by 2928 pixels of RGB in total.

Five of the photoelectric conversion outputs serially outputted simultaneously (in parallel) from the five CCD sensor chips 11a–11e undergo signal processings in the following image processing circuits 101–110 constituting the image processing device B together with a line memory 111, a CPU (Central Processing Unit) 112 and an ROM 113.

An output signal is first quantized by a digital processing circuit 101 comprising a sample and hold circuit and an A/D converter, converted into digital data of 8 bits (256 tones), separated into image data of each color by a latch circuit and then inputted to a 5-channel composite circuit 102.

The 5-channel composite circuit 102 once stores the image data by two lines at a time into first-in first-out memories of 15 (3×5) in total for each chip and for each color. For coincidence with an image forming process in the laser printer, the 5-channel composite circuit 102 then sequentially selects and reads the image data from each chip for one line period to generate a serial image signal in which image data by one line are successive in the order of arrangement of pixels (in the order of read scanning). Signal transmissions between the image processing circuits 102-110 and the laser printer are carried out in accordance with an image clock signal SYNCK to be a reference of timing.

The image data of each color which is simultaneously transmitted as a serial image signal is normalized with a relative ratio between any colors adjusted in a white balance correction circuit 103 so that an image of a correct tone can be formed at the laser printer.

Next, a correction is carried out corresponding to light intensity distribution (unevenness in the quantity of light) of the exposure lamp 17 in the direction of main scanning and corresponding to a sensitivity difference between any elements 12, in a shading correction circuit 104. At the same time, a data signal proportional to the intensity of reflected light is converted in logarithm in accordance with visual characteristics in consideration for the range for reading the original D, and then converted into a density data signal proportional to the density of the original D.

A color correction circuit 105 carries out masking processing for generating density data corresponding to three primary colors of Y (yellow), M (magenta) and C (cyan) of printing toner from image data for each color of RGB, BP processing (Black Paint process) for generating image data corresponding to Bk (black), and UCR processing (Under-Color Removal). A gamma correction circuit 106 carries out background-color removal processing for forming a distinct image with a sharper total contrast, and density control processing for forming an image of a density designated by operation keys which are provided outside the figure.

A color editing circuit 107 carries out three types of edition of a color image such as negative/positive inversion, color change and painting.

A variable-scale magnification/edition circuit 108 changes output timing and output order of an image data signal or scanning speed in the direction of sub-scanning in order to form a variable-scale magnified image which is enlarged or contracted and form an edited image subjected to transfer, mirror inversion or the like by a thinning-out method, an operation method, an interpolation method or the like.

Image data D87-80 subjected to those numerous signal processings undergo, in an MTF (Modulation Transfer Function) correction circuit 109, spatial filtering for preventing the occurrence of edge loss or moire fringe caused by binarization to be carried out in a tone reproduction circuit 110 at the succeeding stage, that is, edge emphasizing by a quadratic differential filter and smoothing by a smoothing filter.

Image data D97-90 the value of which is corrected by the MTF correction circuit 109 are binarized in the tone reproduction circuit 110 having two types of threshold matrixes by an area gradation method in which a dot matrix of L×n with five dots assigned to one pixel is determined as unit area for tone reproduction. The binarized data D97-90 are transmitted as binary image signals VIDEO 0-4 to the laser printer.

The CPU 112 controls all image processings and an operation of the slider 14 and also carries out serial communications between signals inputted from any kinds of keys on an operation panel provided on the top surface of the digital copier, an editor for designating area for color editing (not shown) or from the sensors and a host CPU, provided outside the figure, for controlling an operation of the laser printer. The line memory 111 is employed for temporarily storing image data at a specific processing stage, and programs and various types of data are read out of the ROM 113.

The MTF correction circuit 109 will now be described referring to FIG. 5.

The MTF correction circuit 109 comprises a memory portion 701 for delaying image data serially inputted from the variable-scale magnification/edition circuit 108 by four lines, an edge emphasizing portion 702 for high-emphasizing image data outputted from the memory portion 701 by employing a quadratic differential filter, a smoothing portion 703 for smoothing image data in parallel with the high emphasizing processing of the edge emphasizing portion 702, and a mixing portion 704 for mixing an output of the edge emphasizing portion 702 and that of the smoothing portion 703.

The memory portion 701 is provided commonly for the edge emphasizing portion 702 and the smoothing portion 703. Both portions 702 and 703 carry out pipeline processing which sequentially performs spatial filtering for all pixels. The spatial filtering here means an operation of correcting image data for one pixel (a subject pixel) based on image data for the surrounding pixels. Image data D87-80 serially inputted are stored by four lines. Image data by five lines [(n−2) to (n+2)] together with the image data D87-80 newly inputted are outputted in parallel one by one pixel in response to a signal SYNCK every line. Thus, the memory portion 701 comprises four line memories 711-714 on the first-in first-out basis. The image data D87-80 inputted from the preceding stage are first stored by one line into the line memory 714, then read out in the order of the arrangement of the pixels and serially transferred to the line memories 713, 712 and 711 in turn. That is, when the image data D87-80 on the (n+2)th line is written into the line memory 714, the line of the subject pixel, i.e., the image data D87-80 on the nth line is read out of the second line memory 713, while the image data D87-80 on the (n−2)th line, inputted four lines before, is read out of the line memory 711 at the final transfer stage.

The edge emphasizing portion 702 comprises a quadratic differential filter portion (an edge emphasizing circuit) 720 for producing quadratic differential image data ED08-00, an emphasis control ROM (an ROM for altering reproduction level) 721 for increasing or decreasing a value of the quadratic differential image data ED08-00, an adder 722 for adding image data ED27-20 outputted from the emphasis control ROM 721 and the image data D87-80 on the nth line inputted from the memory portion 701. The edge emphasizing portion 702 outputs high emphasis image data EGD37-30.

The quadratic differential filter portion 720 carries out quadratic differential spatial filtering which produces quadratic differential image data ED08-00 for a quadratic differential image (Laplacian image) of the original image in accordance with the image data D87-80 on the (n−2)th, nth and (n+2)th lines that are simultaneously inputted one by one pixel in synchronization with a signal SYNCK from the memory portion 701. The direction of this filtering is changed by a selection signal SHARP.MODE in correspondence with a threshold matrix to be employed for binarization which will be described later.

FIGS. 6A and 6B show the direction of the quadratic differential spatial filtering.

In the spatial filtering represented by a weighted matrix (mask) M1, the filtering is carried out for a subject pixel at the center of the matrix and for four peripheral pixels each positioned one pixel apart from the subject pixel in both directions of main scanning and sub-scanning. The subject pixel is provided with a weighting coefficient "1", and each of the peripheral pixels with a weighting coefficient "$-\frac{1}{4}$". Evaluating the total sum of image data D87-80 of those five pixels produces a Laplacian image for emphasizing edges in both directions. As to the spatial filtering represented by a matrix M2, a data operation is carried out for the subject pixel and for four peripheral pixels each positioned one pixel apart from the subject pixel in a helical direction with an inclination of 45 degrees to both directions of main scanning and sub-scanning. As a result, a Laplacian image for preventing edge loss in the helical direction is produced. A detailed circuit configuration for implementating such filtering will be described later. The quadratic differential image data ED08-00 of 9 bits outputted from the quadratic differential filter portion 720 are applied to the emphasis control ROM 721 and also outputted to the mixing portion 704 as a control signal of mixing an output of the edge emphasizing portion 702 and that of the smoothing portion 703.

Image data ED27-20 are read at the emphasis control ROM 721. The data ED27-20 are obtained by multiplying by a predetermined number the quadratic differential image data ED08-00 to be input as a lower address corresponding to the SHARP.DATA (3 bits) supplied from the CPU 112.

Figures 7, 8:
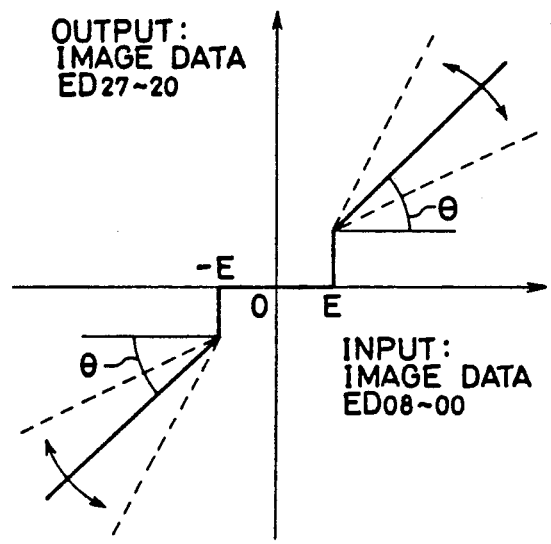
FIG. 7 is a graph showing the relationship between input and output of an emphasis control ROM.
FIG. 8 is a diagram showing the relationship between sharp data and an inclination in FIG. 7.

As shown in FIG. 7, quadratic differential image data ED08-00 having values from "−E" to "E" are omitted to prevent an increase of noise components, and only the data ED08-00 having an absolute value equal to or higher than a predetermined value "E" are corrected in magnification.

Also referring to FIG. 8, while standard sharpness is designated by operation keys not shown in the figure, for example, SHARP.DATA attains the value "3" (011B), and tan θ indicating inclinations of straight lines on the graph, namely, the value of an emphasis coefficient is "1". At this time, image data ED27-20 having the same value as the quadratic differential image data ED08-00 inputted are read out of the emphasis control ROM 721. When SHARP.DATA is "6", image data ED27-20 which is the result of multiplication of the quadratic differential image data ED08-00 by 1.75. Thus, the quadratic differential image data ED08-00 undergo linear transformation in accordance with a scale factor determined by the magnification of sharpness to be designated.

The adder 722 carries out an operation of subtracting predetermined times of the Laplacian image from the original image. The evaluated sum is outputted as image data EGD37-30 in which higher frequencies of a spatial frequency are emphasized.

In parallel with higher frequency emphasis carried out in the edge emphasizing portion 702, the smoothing portion 703 carries out spatial filtering as the smoothing process for averaging in weight image data D87-80 on the (n−2)th, (n−1)th, the nth, (n+1)th and (n+2)th lines inputted from the memory portion 701 in the sub-scanning and then main scanning directions in turn. In this filtering, the size of a smoothing matrix is selected responsive to selection signals SMOOTH.MODE 1, 2, selection signals $\overline{\text{SMOOTH.ON 1}}$, $\overline{\text{ON 2}}$, and selection signals SMOOTH.LVL 1, 2 in accordance with the designation of sharpness (see FIG. 8).

FIGS. 9A and 9B show smoothing matrixes.

The size of the matrix M3 and that of M4 are 5×5 and 3×3, respectively. A weighting coefficient becomes larger toward the center of each of the matrixes.

By smoothing shown in those matrixes M3, M4, image data D87-80 of the subject pixel are replaced by a weighted mean value of data of 5×5 or 3×3 due to the weighting shown in the figures and then outputted as image data SMD27-20. The image data SMD27-20 are normalized by a predetermined coefficient operation so that they do not exceed a maximum value "255" of 8-bit data.

A detailed circuit configuration for realizing such filtering will be described later.

The image data SMD27-20 outputted from the smoothing portion 703 are supplied to the mixing portion 704 in synchronization with output image data EGD37-30 of the edge emphasizing portion 702.

The mixing portion 704 comprises an absolute value evaluating circuit 741, regulating ROMs 742 and 743 for mixing ratio, and an adder 744. The absolute value evaluating circuit 741 converts quadratic differential image data ED08-00 outputted from the quadratic differential filter portion 720 of the edge emphasizing portion 702 into absolute value data ED17-10 and then outputs upper 3 bits of the absolute value data as mixing control data MIX7-5. Data in the regulating ROM 742 has its lower addresses designated by the image data EGD37-30 being an output of the edge emphasizing portion 702. Data in the regulating ROM 743 has its lower addresses designated by the image data SMD27-20 being an output of the smoothing portion 703. The upper addresses of the data in the ROMs 742 and 743 are designated by mixing control data MIX7-5 supplied in common. The adder 744 adds outputs of the regulating ROMs 742 and 743 and then outputs the evaluated sum data as image data D97-90 to the tone reproducing circuit 110 at the succeeding stage.

The quadratic differential image data ED08-00 have values from "−255" to "255" with the most significant bit of 9 bits being as a code bit, and a negative number represented by twos complement is converted into a positive number corresponding to an absolute value of the negative number by the absolute value evaluating circuit 741. Therefore, the absolute data ED17-10 have the values of "0" to "255", and the mixing control data MIX7-5 represent each of eight stages into which the values "0" to "255" are divided 32 by 32.

FIG. 10 shows the relationship in the amount of mixing of image data EGD37-30 and SMD27-20 and the mixing control data MIX7-5.

Out of data stored in advance in the regulating ROMS 742 and 743 are read data having values produced by multiplying the image data EGD37-30 or SMD27-20 by coefficients shown in FIG. 10, in response to the mixing control data MIX7-5. To those coefficients, such values are set as to give priority to the edge emphasizing over the smoothing as the mixing control data MIX7-5 become larger and to normalize so that the resultant sum evaluated at the adder 744 may not exceed the value "255".

For example, when the mixing control data MIX7-5 are "∓2" (010B), data having a value produced by multiplying image data EGD37-30 by 2/7, and data having a value produced by multiplying image data SMD27-20 by 5/7 are read out of the regulating ROMs 742 and 743, respectively, and then both supplied to the adder 744.

As has been described, in this embodiment, since the control of mixing the image data EGD37-30 and SMD27-20 is carried out in accordance with the quadratic differential image data ED08-00 produced for edge emphasizing, means for producing a mixing control signal need not be provided separately, thereby accomplishing a simplified circuit configuration.

Figure 5:
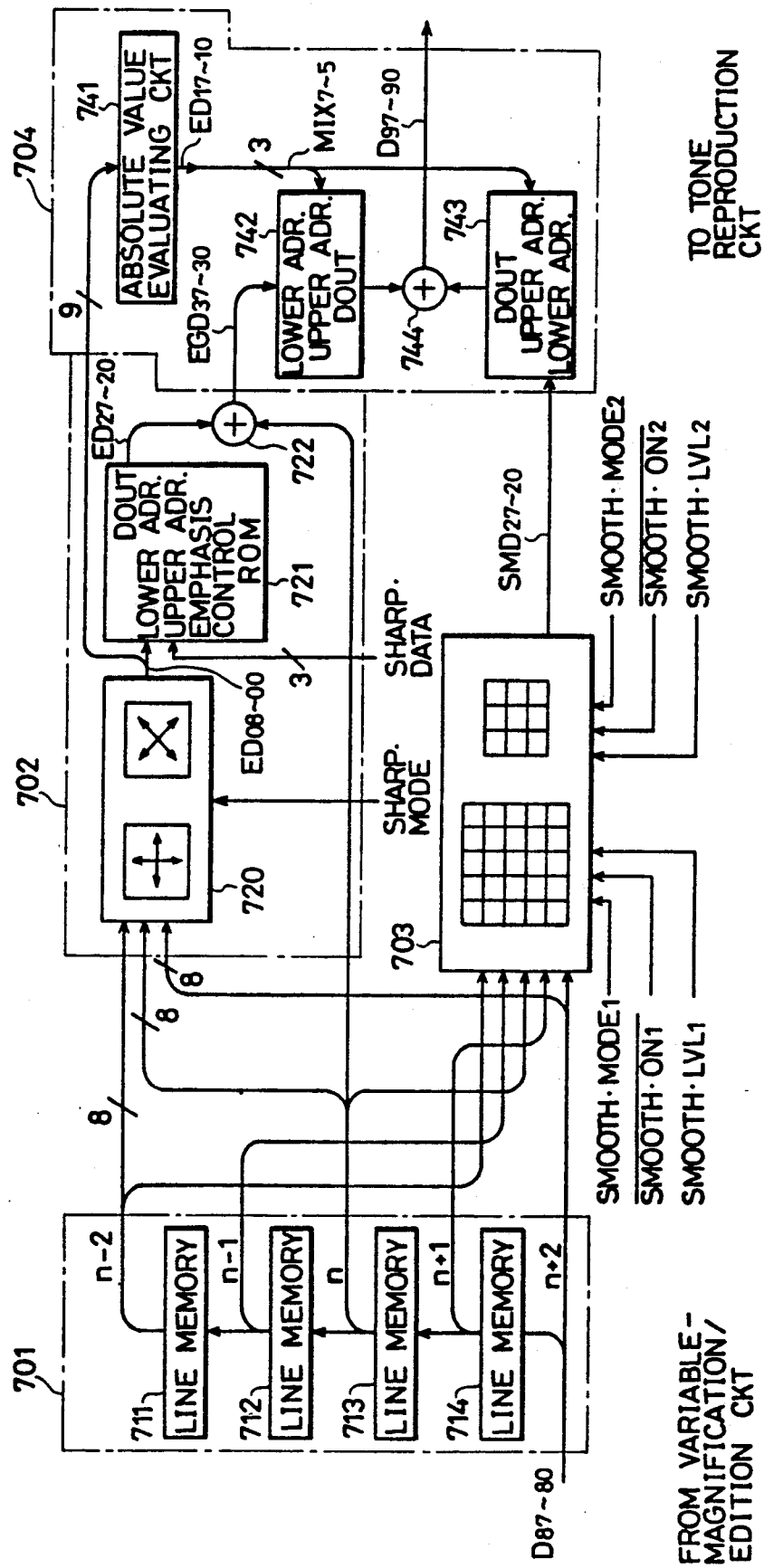
FIG. 5 is a block diagram of an MTF correction circuit.
Figure 11:
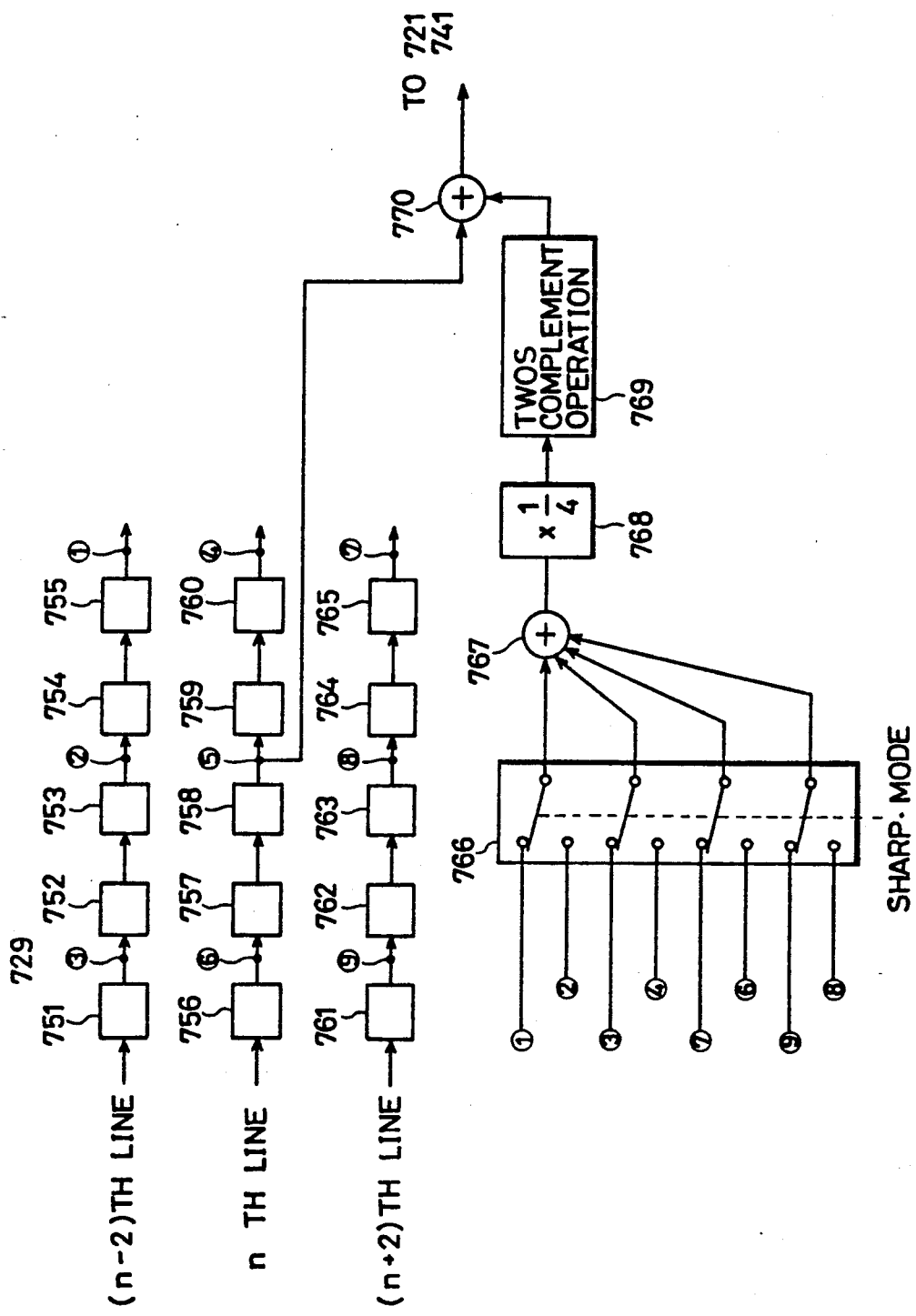
FIG. 11 is a block diagram of a quadratic differential filter portion of FIG. 5.

FIG. 11 is a block diagram of the quadratic differential filter portion 720 of FIG. 5.

The image data D87-80 on the (n−2)th, nth and (n+2)th lines inputted from the memory portion 701 are sequentially delayed by delay circuits 751-755, 756-760 and 761-765 together constituting a matrix register 750, in synchronization with a signal SYNCK.

Assuming that respective outputs of the delay circuits 755, 753, 751, 760, 758, 756, 765, 763 and 761 are denoted with ①, ②, ... ⑧, ⑨, the output ⑤ corresponds to the subject pixel and the remaining numbers to its peripheral pixels at given timing during filtering. The output ⑤ is inputted to an adder 770 and the other outputs into a selector 766 for selecting direction of the processing. When a selection signal SHARP.MODE is at a logical high level, the selector 766 selects the outputs ②, ④, ⑥ and ⑧ as a processing in the direction of scanning. When the selection signal SHARP.MODE is at a logical low level, the selector 766 selects the outputs ③, ⑤, ⑦ and ⑨ as a helical processing. Data ②-⑧, or ③-⑨ of these four peripheral pixels selected by the selector 766 are added together by an adder 767, and then the resultant sum data are multiplied by a weighting coefficient, i.e., by −¼ in a multiplier 768 and a twos complement circuit 769 and then inputted to the adder 770. The adder 770 adds the data ⑤ of the subject pixel and the peripheral pixel data ②-/e,crc/8/ or ③-⑨ to produce a digital Laplacian image by a two-dimensional quadratic spatial differential operation.

Figure 12:
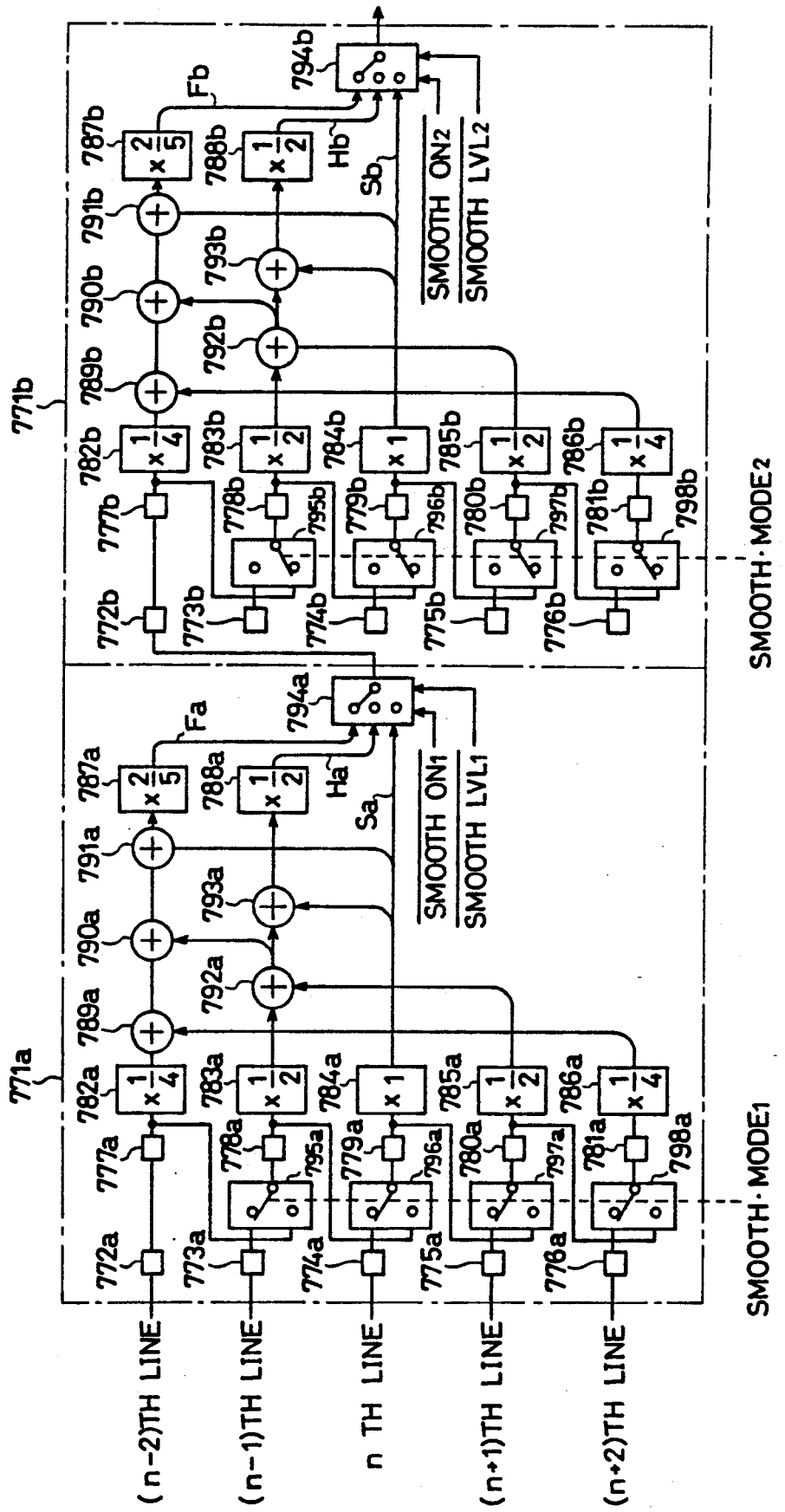
FIG. 12 is a block diagram of a smoothing portion of FIG. 5.
Figure 14:
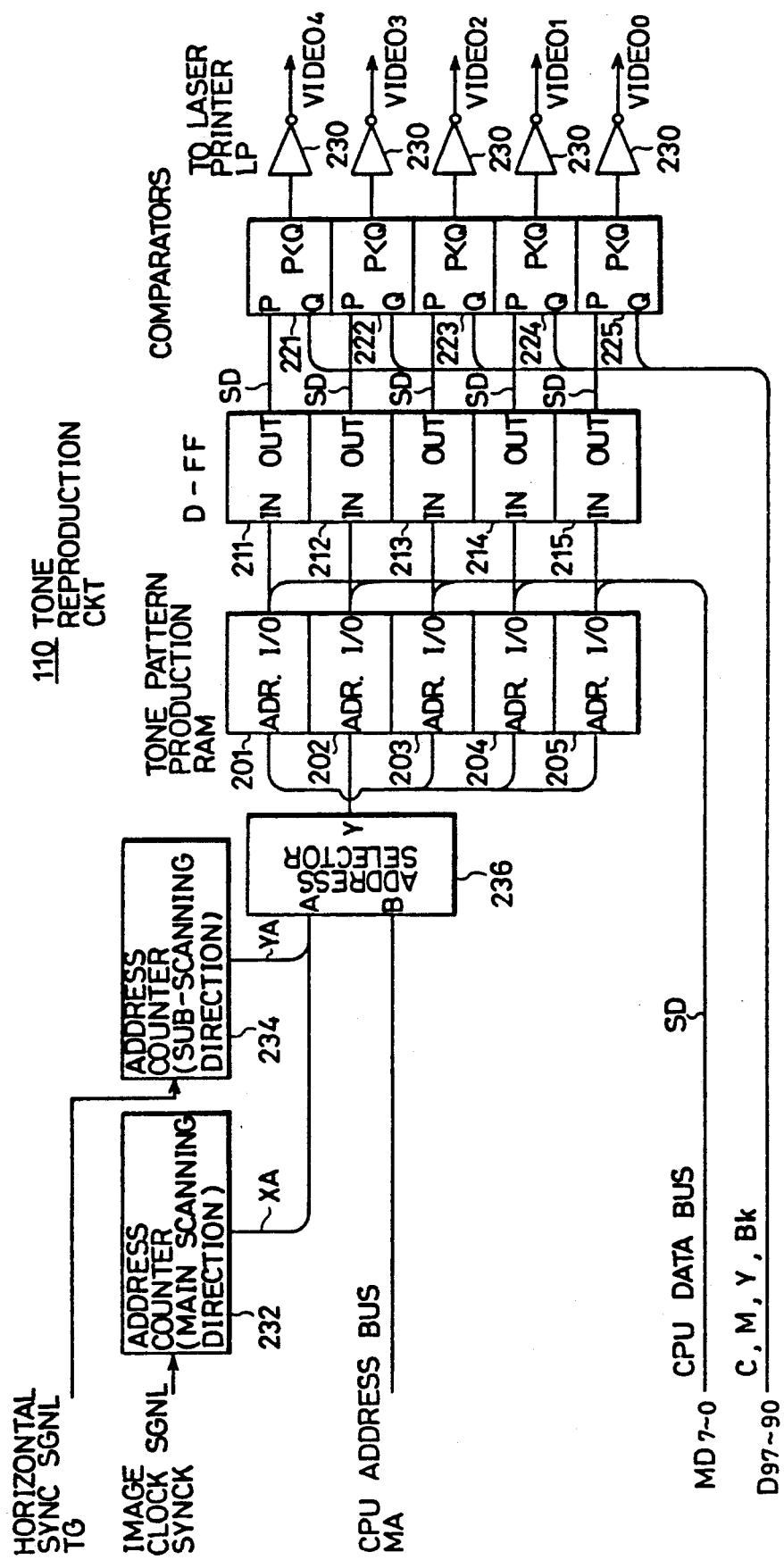
FIG. 14 block diagram of a tone reproduction circuit.

The smoothing portion 703 will now be described with reference to FIG. 12.

The smoothing portion 703 comprises an operating portion 771a for evaluating a weighted average in the sub-scanning direction in the above described matrixes M3 and M4, and an operating portion 771b for evaluating a weighted average in the main scanning direction. Providing the same circuit configuration to both operating portions 771a and 771b makes it possible to simplify a layout pattern of the circuits when configured with gate arrays. That is, the respective operating portions 771a and 771b comprise delay circuits 772a-781a, 772b-781b for shifting input data in synchronization with a signal SYNCK, input selectors 795a-798a, 795b-798b, multipliers 782a-788a, 782b-788b in which predetermined weighted coefficients are provided as multipliers, adders 789a-793a, 789b-793b, and output selectors 794a, 794b for selecting the size of the matrixes. The respective input selectors 795a-798a in the operating portion 771a are fixed to select respective outputs of the delay circuits 773a-776a in response to a signal SMOOTH.MODE1 which is always at the logical low level, while the respective input selectors 795b-798b in the operating portion 971b are fixed to select respective outputs of the delay circuits 777b-780b in response to a signal SMOOTH.MODE2 which is always at the logical high level.

The output selectors 794a and 794b have their input ports provided respectively with outputs Fa, Fb being weighted mean values of five pixels, outputs Ha, Hb being weighted mean values of three pixels, and outputs Sa, Sb being directly supplied values of the subject pixel.

Smoothing processing by the matrix M3 is carried out when the outputs Fa and Fb are selected, while the processing by the matrix M4 is carried out when the outputs Ha and Hb are selected. Selecting combinations of the signals SMOOTH.ON 1, 2 and SMOOTH.LVL 1, 2 makes it possible to make the smoothing matrix be a modified weighted matrix with different number of subject pixels in the main and sub-scanning directions as shown in FIG. 12.

As described above, image data D97-90 subjected to preprocessing in the MTF correction circuit 109 undergo binarization at the tone reproduction circuit 110 at the succeeding stage.

The tone reproduction circuit 110 will now be described referring to FIG. 3.

The tone reproduction circuit 110 compares image data D97-90 (8 bits) from the MTF correction circuit 109 with threshold data SD (8 bits) read out of an ROM 113 and then outputs five binary data for one pixel. The tone reproduction circuit 110 comprises tone pattern producing RAMs (herein referred to as RAM) 201-205 for temporarily storing the threshold data SD, latch circuits 211-215 for latching threshold data SD read out of the RAMs 201-205 in synchronization with image data D97-90, five comparators 221-225 for comparing the threshold data SD from the latch circuits 211-215 with the image data D97-90 and outputting an image signal which is binarized image data D97-90, address counters 232 and 234 for generating addresses for reading threshold data SD from the RAMs 201-205, and an address selector 236 for selecting address buses XA and YA for reading from the address counters 232 and 234 and an address bus MA for writing from the CPU112.

The RAMs 201-205 store two kinds of data groups for forming an image of 8 tones suitable for a character image and that of 29 tones suitable for a dot image, that is, threshold data SD group which belongs to either tone pattern F or G which will be described later. Threshold data SD, which is transferred from the ROM 113, is stored in the RAMs 201-205 to constitute the tone pattern F or G in accordance with selected image forming mode.

When data is transferred from the ROM 113, the address selector 236 selects the CPU address bus MA. Addresses for writing are designated by the CPU 112 in the RAMs 201-205, and threshold data SD is written into the RAMs through CPU data buses MD7-0. When the threshold data SD is read out of the RAMs 201-205, the address selector 236 selects the address buses XA, YA for reading out of the address counters 232 and 234, assigns the selected address buses to the upper bits and lower bits to output the threshold data to address terminals of the RAMs 201-205.

The address counter 232 counts up responsive to inputting of the signal SYNCK described above to be a reference of transfer timing of image data D97-90 by one pixel, while the other address counter 234 counts up responsive to a horizontal synchronizing signal TG to be a reference of one line period.

While the threshold data SD of the tone pattern F are stored in the RAMs 201-205, the address counter 232 counts "0" to "6", and the address counter 234 maintains a clear state. While the threshold data SD of the tone pattern G in the RAMs 201-205, the address counter 232 counts "0" to "13", and the address counter 234 is initialized by the CPU 112 to count "0" to "1".

Therefore, for the RAMs 201-205, the same address is designated every 7 pixels when the threshold data SD of the tone pattern F is stored and every 14 pixels in binarization of one line when the threshold data SD of the tone pattern G is stored.

By this addressing, the threshold data SD stored in the RAMs 201-205 are read out one by one, and then five threshold data SD in total read out are latched in the latch circuits 211-215, respectively.

After transfer timing is adjusted, those five threshold data SD outputted from the latch circuits 211-215 are simultaneously compared with image data D97-90 by one pixel which is to be supplied in common to the comparators 221-225.

Accordingly, the image data D97-90 are binarized based on the threshold data SD, and thus five binary data are simultaneously outputted from the comparators 221-225 for one pixel. These binary signals are inverted by inverters 230, 230 . . . and then transmitted as image signals VIDE04-0 which are tone reproduced to the laser printer.

Next, image formation by the tone pattern F or G will be described with reference to FIGS. 15 and 16. In these figures, reference numerals denote the size of threshold data SD, and thus the larger reference numerals denote the larger size of the threshold data SD.

In case with the tone pattern F, one threshold data SD group comprising seven threshold data SD from "1" to "7", which are threshold values of levels into which the values "0" to "255" are divided, is stored in each of the RAMs 201-205. A tone reproduction unit area H1 in the image formation in this case is a dot matrix of 7×1, and hence it is possible to form a tone-reproduced image with 8 (=7×1 +1) tones.

The comparators 221-225 output signals of the logical high level when the value of image data D97-90 provided in common to their respective input terminals Q is larger than the value of threshold data SD provided to their respective input terminals P. That is, when the value of image data D97-90 of each of pixels j, (j +1) . . . , (j+ 7) on lines 1-5 is "4", for example, an output of each of the comparators 221-225 attains the logical high level when the value of the threshold data SD is equal to or lower than "3".

Figure 15:
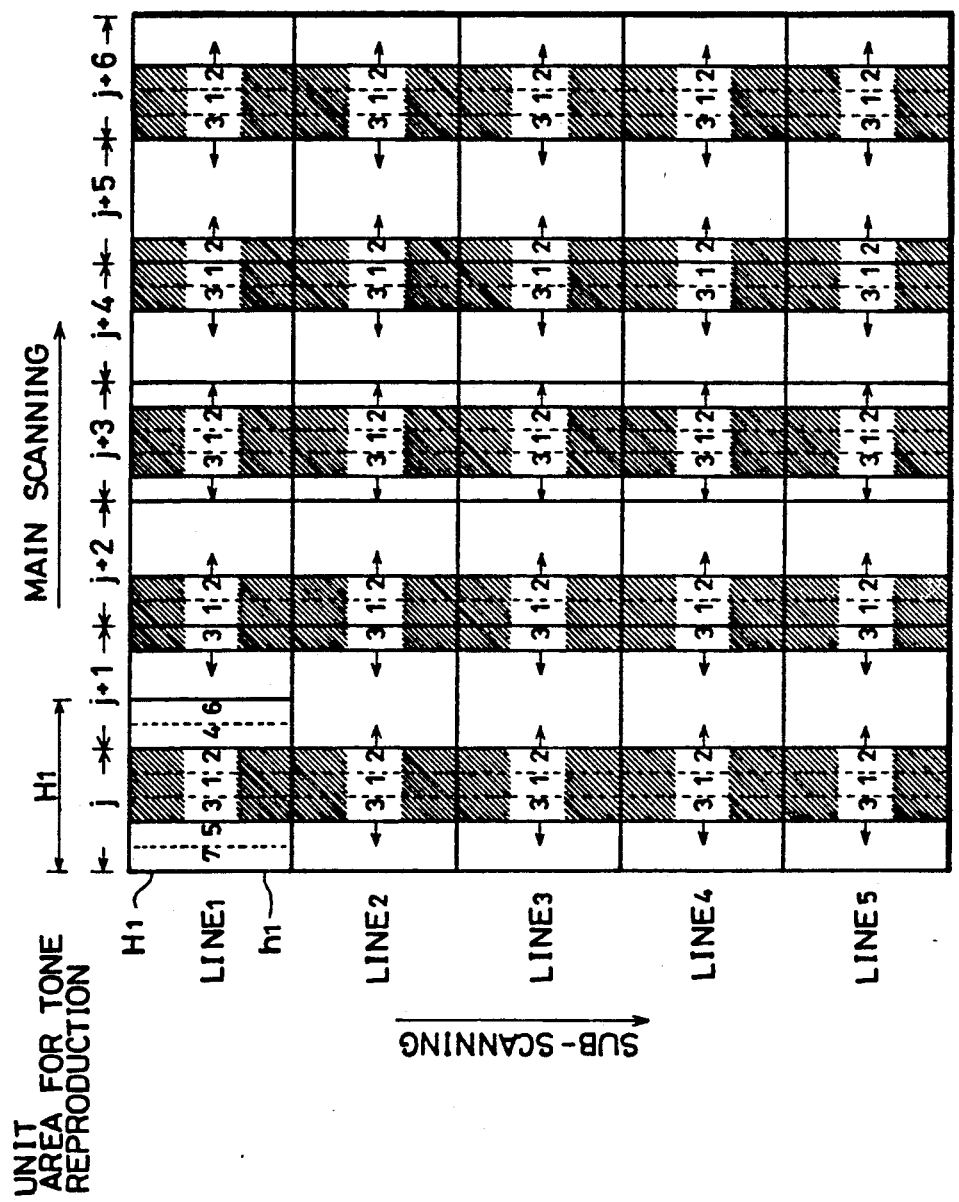
FIGS. 15 and 16 are plan views of an image to be formed.

A hatched area of FIG. 15 shows display dots that a color toning material is adhered during formation of an image, while a blank area shows non-display dots that background of paper on which an image is formed is revealed. Dots corresponding to the threshold data SD from "1" to "3" are display dots in this example of FIG. 15; however, if the image data D97-90 is "5", a dot corresponding to "4" adjacent on the right side to "2" is also a display dot. Further, if the image data D97-90 is "6", a dot corresponding to "5" adjacent on the left side to "3" is also a display dot. That is, within a divided area h1 identical to the unit area H1 for tone reproduction, display dots increase one by one alternately on the left and right sides of the dot (a growth core dot) corresponding to "1"; however, in the case of the tone pattern F, the growth core dots are aligned in a row in the sub-scanning direction, it is liable to cause edge loss in the main scanning direction at a character image portion.

Therefore, in this case, the above described edge emphasizing portion 702 carries out production of quadratic differential image data ED08-00 in the scanning direction by the weighted matrix M1 for filtering (see FIG. 6A).

Figure 16:
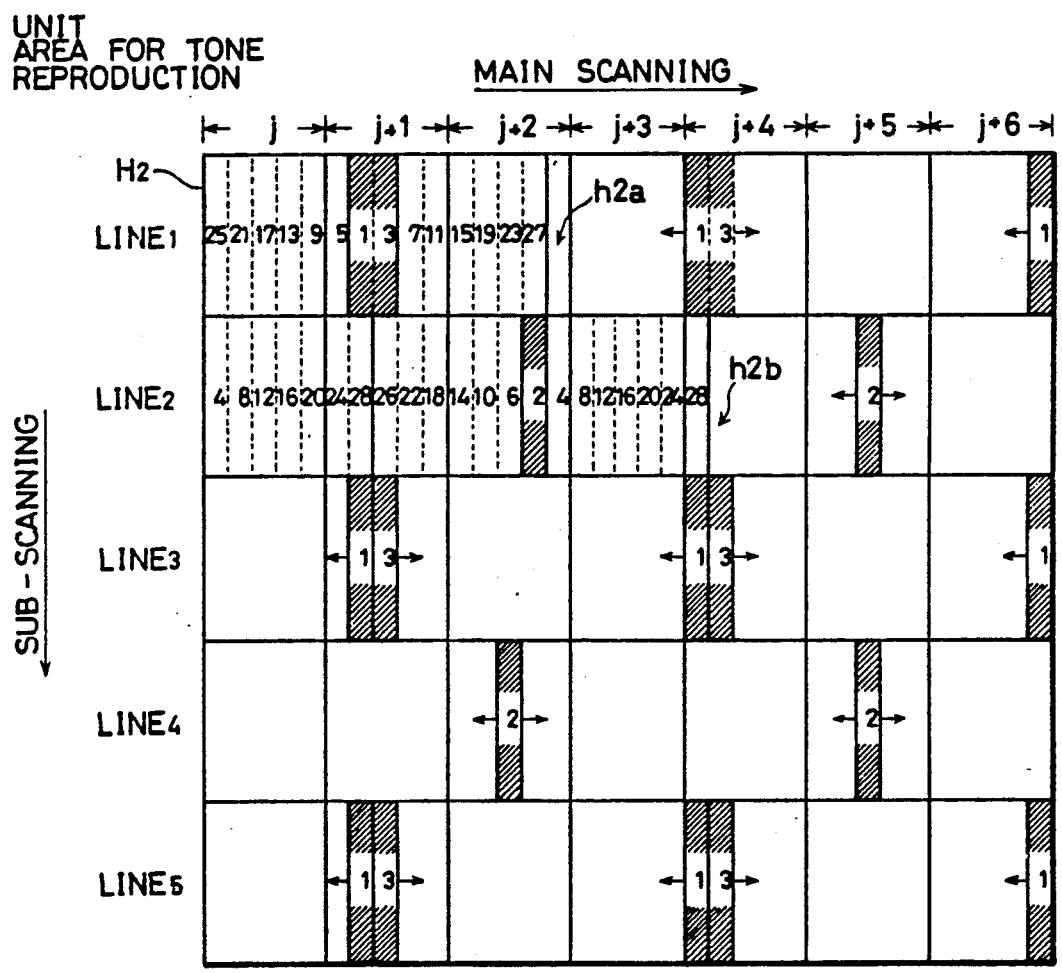

Meanwhile, in the case of the tone pattern G, as shown in FIG. 16, a unit area H2 for tone reproduction is a dot matrix of 14×2 comprising divided areas h2a formed on odd lines and divided areas h2b formed even lines, thereby forming an image of 29 tones.

In this case, with respect to only one of the divided areas h2a and h2b, similarly to the case of the tone pattern F, as the document D gets darker, display dots become increased one by one alternately on the left and right sides of a growth core dot corresponding to "1" or "2"; however, since it is liable to cause edge loss in a direction inclining 45 degrees to the scanning direction, the edge emphasizing portion 702 carries out production of quadratic differential image data ED08-00 in the helical direction by the matrix M2.

In the above described embodiment, the smoothing portion 703 in the MTF correction circuit 109 comprises two operating portions 771a and 771b with the same circuit configuration. Another operating portion with the same circuit configuration may further be provided at the succeeding stage of the operating portion 771b so as to increase the number of pixels in the main scanning direction for smoothing and thus vary the smoothing processing.

In the above described embodiment, the mixing portion 704 in the MTF correction circuit 109 controls mixing of image data EGD37-30, SMD27-20 which are, respectively, outputs of the edge emphasizing portion 702 and the smoothing portion 703 by employing the regulating ROMs 742 and 743, the adder 744 and mixing control data MIX7-5. For achieving the simplification of the configuration, the regulating ROMs 742 and 743, and the adder 744 may be omitted to be replaced by signal selection means so as to select either the image data EGD37-30 or SMD27-20 as output image data D97-90 by employing the mixing control data MIX7-5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device for reading an original image, by relatively shifting in a sub-scanning direction in a plurality of image sensors arranged linearly in a main scanning direction to serially output image signals each corresponding to pixels read, comprising:
   a plurality of line memories each capable of storing said image signals of at least one line is said main scanning direction;
   storage means for sequentially storing in said plurality of line memories said image signals serially transmitted from said image sensors;
   output means for outputting in parallel said image signals transmitted from said plurality of line memories; and
   edge emphasizing means for emphasizing edges of images formed by said image signals outputted by said output means in response to signals externally applied, wherein said edge emphasizing means comprises a plurality of filters which vary in the direction of said edge emphasizing.

2. The image processing device in accordance with claim 1, wherein
the direction of said edge emphasizing comprises said main scanning direction and a direction intersecting said main scanning direction.

3. The image processing device in accordance with claim 1, wherein
said image signals are employed to form an image, and said edge comprises a portion where density of said image varies.

4. An image processing device for reading an original image, by relatively shifting in a sub-scanning direction a plurality of image sensors arranged linearly in a main scanning direction to serially output image signals each corresponding to pixels read, comprising:
a plurality of line memories each capablle of storing said image signals of at least one line in said main scanning direction;
storage means for sequentially storing in said plurality of line memories said image signals serially transmitted from said image sensors;
output means for outputting in parallel said image signals from each of said line memories;
smoothing means for smoothing said image signals for each line outputted by said output measn;
said smoothing means having a two dimensional smoothing matrix; and
altering means for altering the szie of said smoothing matrix.

5. The image processing device in accordance with claim 4, wherein
said smoothing means comprises first smoothing means for smoothing in said sub-scanning direction said image signals for said each line outputted from said storage means, and second smoothing means for smoothing in said main scanning direction said image signals smoothed by said first smoothing means,
said second smoothing being carried out after said first smoothing.

6. An image processing device for reading an original image, by relatively shifting in a sub-scanning direction a plurality of image sensors arranged linearly in a main scanning direction to serially output image signals each corresponding to pixels read, comprising:
a plurality of line memories each capable of storing said image signals of at least one line in said main scanning direction;
storage means for sequentially storing in said plurality of line memories said image signals transmitted serially from said image sensors;
output means for outputting in parallel said image signals from each of said line memories;
edge emphasizing means for high emphasizing image signals for each line outputted from said storage means;
smoothing means for smoothing said image signals for said each line outputted from said output means;
means for mixing an output of said edge emphasizing means and that of said smoothing means; and
means for altering mixing ratio in accordance with the output of said edge emphasizing means.

7. An image processing device for reading an original image, by relatively shifting in a sub-scanning direction a plurality of image sensors arranged linearly in a main scanning direction to serially output image signals each corresponding to pixels read, comprising:
a plurality of line memories each capable of storing said image signals of at least one line in said main scanning direction;
storage means for sequentially storing in said plurality of line memories said image signals serially transmitted from said image sensors;
output means for outputting in parallel said image signals from each of said line memories;
edge emphasizing means for emphasizing edges of images formed by said image signals for each line outputted from said storage means;
smoothing means for smoothing said image signals for said each line outputted by said output means;
selecting means for selecting either an output of said edge emphasizing means or that of said smoothing means to output the selected output; and
control means for controlling said selecting means in accordance with the output of said edge emphasizing means.

8. An image processing method of reading an original image, by relatively shifting in a sub-scanning direction a plurality of image sensors arranged linearly in a main scanning direction to serially output image signals each corresponding to pixels read, comprising the steps of:
sequentially delaying said image signals serially transmitted;
outputting in parallel said image signals by a predetermined number of lines;
selecting one filter out of a plurality of filters having different directional properties; and
emphasizing edges of images formed by said image signals outputted in parallel, by said selected filter.

9. An image processing method of reading an original image, by relatively shifting in a sub-scanning direction a plurality of image sensors arranged linearly in a main scanning direction to serially output image signals each corresponding to pixels read, comprising the steps of:
sequentially delaying said image signals serially transmitted;
in parallel said image signals by a predetermined line;
designating the size of a two dimensioned smoothing matrix for smoothing; and
smoothing said image signals outputted in parallel, in accordance with said designated smoothing matrix.

10. An image processing method of reading an original image, by relatively shifting in a sub-scanning direction a plurality of image sensors arranged linearly in a main scanning direction to serially output image signals each corresponding to pixels read, comprising the steps of:
sequentially delaying said image signals serially transmitted;
outputting in parallel said image signals by a predetermined line;
edge emphasizing by a filter said image signals outputted in parallel;
smoothing in accordance with a smoothing matrix said image signals outputted in parallel;
mixing outputs of said edge-emphasized image signals and those of said smoothed image signals; and
altering mixing ratio of each of said signals mixed, in accordance with said edge-emphasized image signals.

11. A method of reading an original image line by line by a plurality of image sensors arranged in a main scanning direction to serially output image signals read, comprising the steps of:

delaying said image signals serially outputted and outputting in parallel said image signals by a predetermined number of lines;

selecting one filter out of a plurality of filters having different directional properties of processing; and adding a specified image signal out of said plurality of image signals outputted in parallel and peripheral image signals of said specified image signal in accordance with said selected filter.

* * * * *